United States Patent
Kim et al.

(10) Patent No.: US 6,714,185 B2
(45) Date of Patent: Mar. 30, 2004

(54) BACK LIGHTING APPARATUS OF LIQUID CRYSTAL DISPLAY USING OPTICAL FIBER

(75) Inventors: Sung-Sik Kim, Siheung (KR); Jung-Young Son, Sungnam (KR); Vadim V. Smirnov, Petersburg (RU); Yong-Jin Choi, Seoul (KR); Hyuk-Soo Lee, Seoul (KR); Ji-Eun Pan, Seoul (KR)

(73) Assignees: Samsung Electronics Co., Ltd., Suwon-si (KR); Korea Institute of Science and Technology, Seoul (KR)

( * ) Notice: Subject to any disclaimer, the term of this patent is extended or adjusted under 35 U.S.C. 154(b) by 85 days.

(21) Appl. No.: 09/752,768

(22) Filed: Jan. 3, 2001

(65) Prior Publication Data

US 2001/0050667 A1 Dec. 13, 2001

(30) Foreign Application Priority Data

Feb. 21, 2000 (KR) ............................ 2000/8225

(51) Int. Cl.[7] ............................ G09G 3/36; A47F 3/00; G02B 6/02; G02F 1/1335
(52) U.S. Cl. .................... 345/102; 362/561; 385/123; 385/901; 349/62; 264/1.24
(58) Field of Search .................... 345/32, 102; 385/31, 385/123, 115, 147, 901, 28, 30, 39, 129, 130, 131, 132, 126; 362/554, 556, 561, 559, 551; 349/61, 62; 264/1, 24; 430/4, 5; 427/163.2; 65/429, 430

(56) References Cited

U.S. PATENT DOCUMENTS

| | | | |
|---|---|---|---|
| 4,400,056 A | * 8/1983 | Cielo | .......................... 385/27 |
| 4,428,761 A | * 1/1984 | Howard et al. | ................ 65/429 |
| 5,042,892 A | 8/1991 | Chiu et al. | |
| 5,165,187 A | 11/1992 | Shahidi-Hamedani et al. | |
| 5,187,765 A | 2/1993 | Muehlemann et al. | |
| 5,226,105 A | 7/1993 | Myers | |
| 5,307,245 A | * 4/1994 | Myers et al. | ................ 362/554 |
| 5,384,882 A | * 1/1995 | Shimamune et al. | ........ 385/116 |
| 5,400,224 A | * 3/1995 | DuNah et al. | ................. 362/31 |
| 5,432,876 A | 7/1995 | Appeldorn et al. | |
| 5,542,016 A | 7/1996 | Kaschke | |
| 5,627,933 A | * 5/1997 | Ito et al. | ...................... 385/123 |
| 5,631,994 A | * 5/1997 | Appeldorn et al. | ......... 362/551 |
| 5,633,966 A | * 5/1997 | Nakaishi | ..................... 385/123 |
| 5,659,643 A | * 8/1997 | Appeldorn et al. | ......... 362/551 |
| 5,682,213 A | * 10/1997 | Schmutz | ...................... 349/61 |
| 5,708,739 A | * 1/1998 | Patton | ......................... 385/37 |
| 5,748,828 A | 5/1998 | Steiner et al. | |
| 5,754,159 A | 5/1998 | Wood et al. | |
| 5,781,675 A | * 7/1998 | Tseng et al. | .................. 385/30 |
| 5,793,911 A | 8/1998 | Foley | |
| 5,857,761 A | * 1/1999 | Abe et al. | ...................... 362/31 |
| 6,039,553 A | * 3/2000 | Lundin et al. | ............. 264/1.24 |
| 6,104,371 A | 8/2000 | Wang et al. | |
| 6,104,452 A | * 8/2000 | Schmutz | ...................... 349/61 |
| 6,123,442 A | * 9/2000 | Freier et al. | ................ 362/559 |
| 6,174,648 B1 | * 1/2001 | Terao et al. | ................... 430/5 |
| 6,234,656 B1 | * 5/2001 | Hosseini et al. | ............ 362/556 |
| 6,307,987 B1 | * 10/2001 | Wang et al. | ................ 385/901 |

* cited by examiner

*Primary Examiner*—Steven Saras
*Assistant Examiner*—Paul A. Bell
(74) *Attorney, Agent, or Firm*—Robert E. Bushnell, Esq.

(57) ABSTRACT

One embodiment of a back lighting apparatus of a liquid crystal display apparatus includes a light source for generating light, a plurality of optical fibers having both ends optically connected with the light source and a part of the optical fibers attached to the back surface of the liquid crystal display panel. Each optical fiber has one or more diffusion lines for scattering light from the light source to a pixel line of the liquid crystal display panel, thereby lighting the entire portion of the back surface of the liquid crystal display panel. The apparatus has a support plate for fixing the optical fibers to the back surface of the liquid crystal display panel, and an optical diffusing unit for optically connecting the light source to the optical fibers. The present invention can improve the resolution of a liquid crystal display apparatus and allow implementation of a 3D image.

24 Claims, 10 Drawing Sheets

BACK LIGHTING APPARATUS OF LIQUID CRYSTAL DISPLAY USING OPTICAL FIBER

CLAIM OF PRIORITY

This application makes reference to, incorporates the same herein, and claims all benefits accruing under 35 U.S.C. §119 from my application APPARATUS FOR BACK LIGHTING OF LCD HAVING AN OPTICAL FIBER filed with the Korean Industrial Property Office on Feb. 21, 2000 and there duly assigned Ser. No. 8225/2000.

BACKGROUND OF THE INVENTION

1. Field of the Invention

The present invention relates to a back lighting apparatus of a liquid crystal display (LCD), and in particular to a back lighting apparatus of an LCD for implementing a three-dimensional image.

2. Description of the Background Art

Generally, in a liquid crystal display (LCD) apparatus, a voltage is applied to a liquid crystal which is an organic liquid formed of long chain molecules and which is in a semi-crystal liquid state based on a rearrangement of the molecules. Upon application of a voltage, the molecular structure is changed, thereby yielding a different light transmittance. A liquid crystal is filled into a gap formed between two thin glass plates, and a voltage is applied through a transparent electrode, so that the molecular structure of the liquid crystal is changed. Light penetrates through the liquid crystal from the back of the system. The above-described liquid crystal display has a slow response speed but consumes little power. In addition, it is possible to fabricate a thin plate-shaped liquid crystal display. Therefore, liquid crystal displays are increasingly being used in display apparatus of computers, in particular as the monitors of the computers.

The resolution of a liquid crystal display apparatus is determined based on a size and density of pixels of the apparatus, of the aperture ratio, field of view, light efficiency, etc.

The size and density of the pixels refers to a division of a liquid crystal display panel and affects the resolution of the screen. That is, in the liquid crystal display apparatus, as the size of the pixel is made smaller and the density of the pixels is increased, since the light which is transmitted by the liquid crystal display panel is divided more finely, the resolution is increased.

The aperture represents a ratio representing the fraction that the pixels actually occupy in the liquid crystal display panel and is a factor capable of determining the amount of light which is transmitted by each pixel of the liquid crystal display. Therefore, as the aperture is increased, the liquid crystal display apparatus consumes less power. However, in an actual liquid crystal display apparatus, there is a connection cable capable of supplying a pixel-based driving signal to the liquid crystal display panel. Therefore, it is impossible to obtain 100% aperture. In this case, the optical efficiency is increased based on a method of concentrating light at the pixels of the liquid crystal display panel.

The field of view represents an angle at which the information displayed on the flat-type display apparatus is correctly viewed in the front direction and is determined by a scattering angle of light which is transmitted the liquid crystal display panel.

The light efficiency represents a degree that the light generated in the back portion is transmitted by a liquid crystal display panel and is related to the aperture. The light efficiency can affect the power consumption of the liquid crystal display. That is, as the light efficiency increases, the liquid crystal display apparatus consumes less power.

Since the liquid crystal display does not itself generate light, the liquid crystal display includes a rear-direction lighting apparatus capable of generating light in the back portion, with the light being transmitted through the liquid crystal display.

In a conventional liquid crystal display apparatus and lighting method, a back lighting apparatus includes a light source, a light guide plate uniformly distributing light from the light source on the back of a liquid crystal display panel, prism plates for concentrating light incident from through the light guide plate, and a plurality of diffuser sheets for diffusing light concentrated by the prism plates onto the back surface of the liquid crystal display panel.

The back lighting apparatus of the conventional liquid crystal display apparatus uniformly distributes light onto the back surface of the liquid crystal display panel in the following ways.

The light from the light source is reflected from a reflection mirror which surrounds the light source or is directly inputted into the light guide plate from the light source. A part of the light inputted into the light guide plate is directly transmitted by a portion near the light source of an upper surface of the light guide plate and is transmitted by the prism plates. The remaining part is fully or partly reflected in the direction of a slanted lower surface of the light guide plate. The light among the light reflected by the upper surface is re-reflected in the direction of a portion slanted opposite to the light source, and a part of the light is scattered by a scattering portion of the lower surface and transmits the upper surface and is inputted into the prism plates. A part of the light which is reflected by the lower surface and is re-inputted into the upper surface directly transmits the upper surface and is inputted into the prism plates. The remaining light is reflected into the lower surface.

The light generated by the optical source is inputted into the light guide plate and is reflected by the horizontal upper surface and the slanted lower surface of the light guide plate and transmits in the direction opposite to the light source in the light guide plate and is inputted into the prism plate arranged parallel with a triangle prism and the prism plate parallel with the prism plate through the upper surface of the light guide plate. At this time, as the light is distanced from the light source, the distance of the light guide plate is decreased, and the scattering portion is distanced from the light source, a large amount of the light is scattered in a direction that the intensity of the light is relatively small.

Therefore, the light is uniformly inputted into the prism plate irrespective of the distance of the light source. In addition, the light is inputted near the vertical axis by the prism plates and and is transmitted by the film type diffuser sheets formed of small glass balls and is uniformly diffused and is inputted into the entire back surface of the liquid crystal display panel.

The back lighting apparatus of the conventional liquid crystal display apparatus is capable of uniformly distributing the light from the light source onto the back of the liquid crystal display panel. The back lighting apparatus of the conventional liquid crystal display apparatus includes the light source which is concentrated at a portion of the liquid crystal display panel, and the scattering portion is densely arranged for thereby scattering a large amount of the light.

However, since the luminous intensity of the liquid crystal display panel is relatively weak at a portion distanced from the light source, it is impossible to uniformly output the light onto the liquid crystal display panel. Therefore, the liquid crystal display panel which uses the back lighting apparatus of the conventional liquid crystal display apparatus is not capable of obtaining a uniform resolution.

In addition, since the back lighting apparatus of the conventional liquid crystal display apparatus outputs light onto the entire portions of the liquid crystal display panel using one light source, the optical efficiency is decreased, and the power consumption is increased.

An LCD apparatus related to the above-described conventional apparatus is disclosed in U.S. Pat. No. 5,754,159, to Wood et al., entitled INTEGRATED LIQUID CRYSTAL DISPLAY AND BACKLIGHT SYSTEM FOR AN ELECTRONIC APPARATUS. In this patent, a stripe-shaped light source having a length slightly longer than the pixel line of the LCD panel is arranged in parallel, so that it is possible to obtain uniform light, and the light efficiency is high. However, it is difficult to fabricate the stripe-shaped light source, and the reliability of the product is decreased.

Another LCD apparatus related to the above-described conventional apparatus is disclosed in U.S. Pat. No. 5,748,828, to Steiner et al., entitled COLOR SEPARATING BACKLIGHT, which adapts a well known lighting method which is generally used by the known LCD apparatuses. However, the back lighting is too thick, and the light efficiency is decreased.

Additional lighting apparatus of the conventional art are seen in the following U.S. Patents.

U.S. Pat. No. 5,042,892, to Chiu et al., entitled FIBER OPTIC LIGHT PANEL, describes a light emitting panel formed by a single layer of parallel optical fibers. The fibers may have cladding removed on one side to allow light to escape.

U.S. Pat. No. 5,165,187, to Shahidi-Hamedani et al., entitled EDGE ILLUMINATED SIGN PANEL, describes an edge illuminated sign panel, which includes a flat ribbon of parallel optical fibers. The fibers leaving the ribbon are bundled and aligned to receive a light beam. Indicia may be formed by selectively abrading or embossing the surface of the ribbon to form areas from which the light may escape.

U.S. Pat. No. 5,187,765, to Muehlemann et al., entitled BACKLIGHTING PANEL, describes a light emitting panel backlighted by an optical fiber assembly in which the optical fibers are positioned in parallel across the bottom of a frame and transverse notches are scored into the cladding of the fibers to permit light emission.

U.S. Pat. No. 5,226,105, to Myers, entitled FIBER OPTIC BACKLIGHTING PANEL AND DOT PROCESS FOR MAKING SAME, describes a fiber optic backlighting panel having a layer of optical fibers arranged adjacent to each other. The optical fibers are selectively terminated at different locations using a laser.

U.S. Pat. No. 5,432,876, to Appeldom et al., entitled ILLUMINATION DEVICES AND OPTICAL FIBERS FOR USE THEREIN, describes an illumination device having a substantially parallel array of optical fibers and a front panel which is a liquid crystal shutter array. In this device, one fiber of every three transmits red light, one fiber transmits green light and one transmits blue light, to define a pixel. The fibers have notches of a variety of shapes to divert a proportion of the light propagating through the fiber to emit light from the fiber.

U.S. Pat. No. 5,542,016, to Kaschke, entitled OPTICAL FIBER LIGHT EMITTING APPARATUS, describes as conventional an optical fiber light emitting panel formed of a plurality of optical fibers arranged in parallel. The patent notes that disrupting the surface of an optical fiber by scratching at discrete locations leads to the emission of light at these locations.

U.S. Pat. No. 5,793,911, to Foley, entitled ILLUMINATION DEVICE, describes an illumination device for backlighting a liquid crystal display which includes a substrate containing a groove and an optical fiber fitted into the groove. The outer cladding layer of the optical fiber is of reduced thickness on the exposed side, leading to light emission through the reduced thickness layer.

U.S. Pat. No. 6,104,371, to Wang et al., entitled MODULAR HIGH-INTENSITY FIBER OPTIC BACKLIGHT FOR COLOR DISPLAYS, describes a modular fiber optic color backlight. The backlight uses polymer optical fiber having cut and refilled regions containing internal mirrors, which serve as taps for light to exit the fiber.

Moreover, in order to implement a three-dimensional image in a conventional LCD apparatus using backlighting, additional apparatus such as a lenticular, a parallax barrier, a polarization stripe plate, etc., is used for separating pixels at a plurality of points arranged by each pixel line of the LCD panel by spatial multiplexing. As such, the construction and structure are complicated. In addition, fabrication costs of such apparatus are increased.

SUMMARY OF THE INVENTION

It is therefore an object of the invention to provide a better liquid crystal display apparatus.

A further object of the invention is to provide a backlighting apparatus of a liquid crystal display.

A yet further object of the invention is to provide a liquid crystal display apparatus which can display a three-dimensional image.

A still further object of the invention is to provide a liquid crystal display apparatus which is simple in structure.

Another object of the invention is to provide a liquid crystal display apparatus which is optically efficient and consumes little power.

Accordingly, the present invention provides a back lighting apparatus of a liquid crystal display apparatus using an optical fiber capable of uniformly lighting the entire LCD apparatus by effectively supplying light to each pixel line of an LCD panel using the optical fiber, consuming a small amount of power based on a high optical efficiency and implementing a 3D image without using an additional apparatus.

To achieve the above objects, there is provided a back lighting apparatus of an LCD apparatus which includes a light source for generating light, a plurality of optical fibers having both ends optically connected with the light source and a part of the same attached to the back surface of the LCD panel for emitting the light generated by the light source to each pixel line of the LCD panel based on a scattering of the diffusion line for thereby lighting the entire portion of the back surface of the LCD panel, a support plate for fixing the optical fibers to the back surface of the LCD panel, and an optical diffusing unit for optically connecting the light source and the optical fibers.

Each optical fiber may include two diffusion lines capable of scattering light in different directions for thereby concurrently lighting two neighboring pixel lines.

A fresnel lens is attached on a front surface of the LCD panel for converging two scattering light which are scattered by two diffusion lines and transmit the pixel lines of the LCD panel at both sides of the front portion of the LCD panel for thereby implementing a 3D image.

The light scattering unit is surrounded by a reflection unit and includes both ends of each of the optical fibers, so that the light generated by the light source is scattered into air bubbles formed in the interior and converged into each optical fiber.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

Turning now to the drawings, the back lighting apparatus of the conventional liquid crystal display described above will now be described with reference to FIG. 1, which is a lateral cross-sectional view illustrating a representative construction of the back lighting apparatus of the conventional liquid crystal display.

Figure 1:
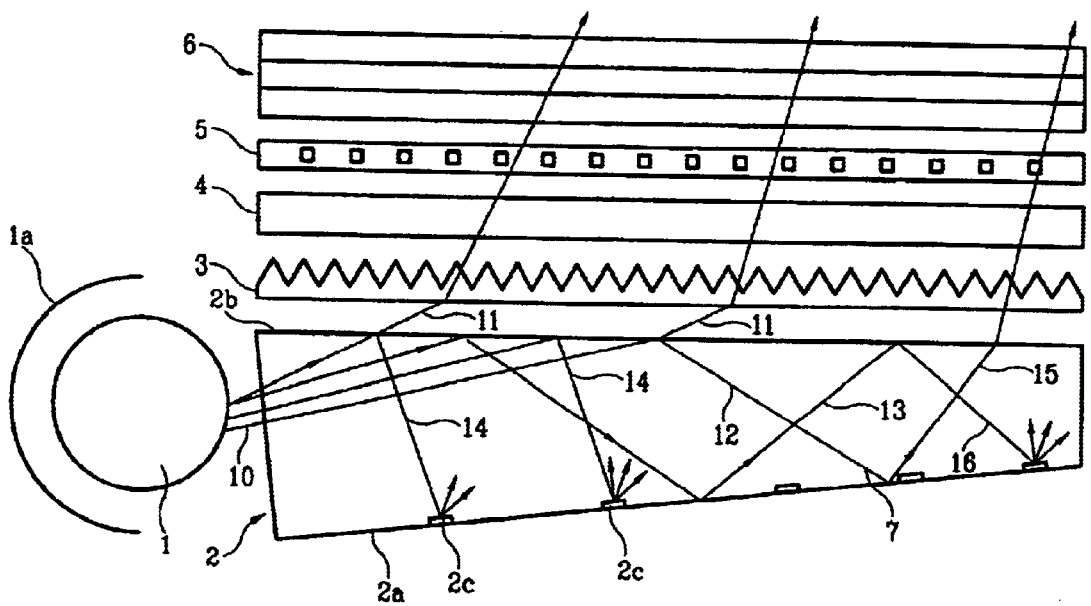
FIG. 1 is a lateral cross-sectional view illustrating the construction of a back lighting apparatus of a conventional liquid crystal display apparatus and a lighting method.

As shown in FIG. 1, the back lighting apparatus of the conventional liquid crystal display apparatus includes a light source 1, a light guide plate 2 uniformly distributing light 10 from the light source 1 on the back of a liquid crystal display panel 6, prism plates 3 and 4 for concentrating light being incident from through the light guide plate 2, and a plurality of diffuser sheets 5 for diffusing light concentrated by the prism plates 3 and 4 onto the back surface of the liquid crystal display panel 7.

The back lighting apparatus of the conventional liquid crystal display apparatus uniformly distributes light onto the back surface of the liquid crystal display panel 7 in the following ways.

As shown in FIG. 1, the light from the light source 1 is reflected from a reflection mirror 1a which surrounds the light source 1 or is directly inputted into the light guide plate 2 from the light source 1. A part 11 of the light 10 inputted into the light guide plate 2 is directly transmitted by a portion near the light source 1 of an upper surface 2a of the light guide plate 2 and is transmitted by the prism plates 3 and 4. The remaining part 12 is fully or partly reflected in the direction of a slanted lower surface 2b of the light guide plate 3. The light 13 among the light 12 reflected by the upper surface 2a is re-reflected in the direction of a portion slanted opposite to the light source 1, and a part of the light 14 is scattered by a scattering portion 2c of the lower surface 2b and transmits the upper surface 2a and is inputted into the prism plates 3 and 4. A part 15 of the light which is reflected by the lower surface 2b and is re-inputted into the upper surface 2a directly transmits the upper surface 2a and is inputted into the prism plates 3 and 4. The remaining light 16 is reflected into the lower surface 2b.

The light 10 generated by the optical source is inputted into the light guide plate 2 and is reflected by the horizontal upper surface 2a and the slanted lower surface 2b of the light guide plate 2 and transmits in the direction opposite to the light source 1 in the light guide plate 2 and is inputted into the prism plate 3 arranged parallel with a triangle prism and the prism plate 4 parallel with the prism plate 3 through the upper surface 2a of the light guide plate 2. At this time, as the light 10 is distanced from the light source, the distance of the light guide plate is decreased, and the scattering portion 2c is distanced from the light source 1, a large amount of the light is scattered in a direction that the intensity of the light is relatively small.

Therefore, the light is uniformly inputted into the prism plate 3 irrespective of the distance of the light source 1. In addition, the light is inputted near the vertical axis by the prism plates 3 and 4 and is transmitted by the film type diffuser sheets 5 formed of small glass balls and is uniformly diffused and is inputted into the entire back surface of the liquid crystal display panel 6.

The back lighting apparatus of the conventional liquid crystal display apparatus is capable of uniformly distributing the light 10 from the light source 1 onto the back of the liquid crystal display panel 6. The back lighting apparatus of the conventional liquid crystal display apparatus includes the light source 1 is concentrated at a portion of the liquid crystal display panel 7, the scattering portion 2c is densely arranged for thereby scattering a large amount of the light. However, since the luminous intensity of the liquid crystal display panel 7 is relatively weak at a portion distanced from the light source 1, it is impossible to uniformly output the light onto the liquid crystal display panel 7. Therefore, the liquid crystal display panel which uses the back lighting apparatus of the conventional liquid crystal display apparatus is not capable of obtaining a uniform resolution.

In addition, since the back lighting apparatus of the conventional liquid crystal display apparatus outputs light onto the entire portions of the liquid crystal display panel using one light source 1, the optical efficiency is decreased, and the power consumption is increased.

The features and construction of the back lighting apparatus of the liquid crystal display apparatus using an optical fiber according to the present invention will be now explained with reference to the accompanying drawings.

Figure 2:
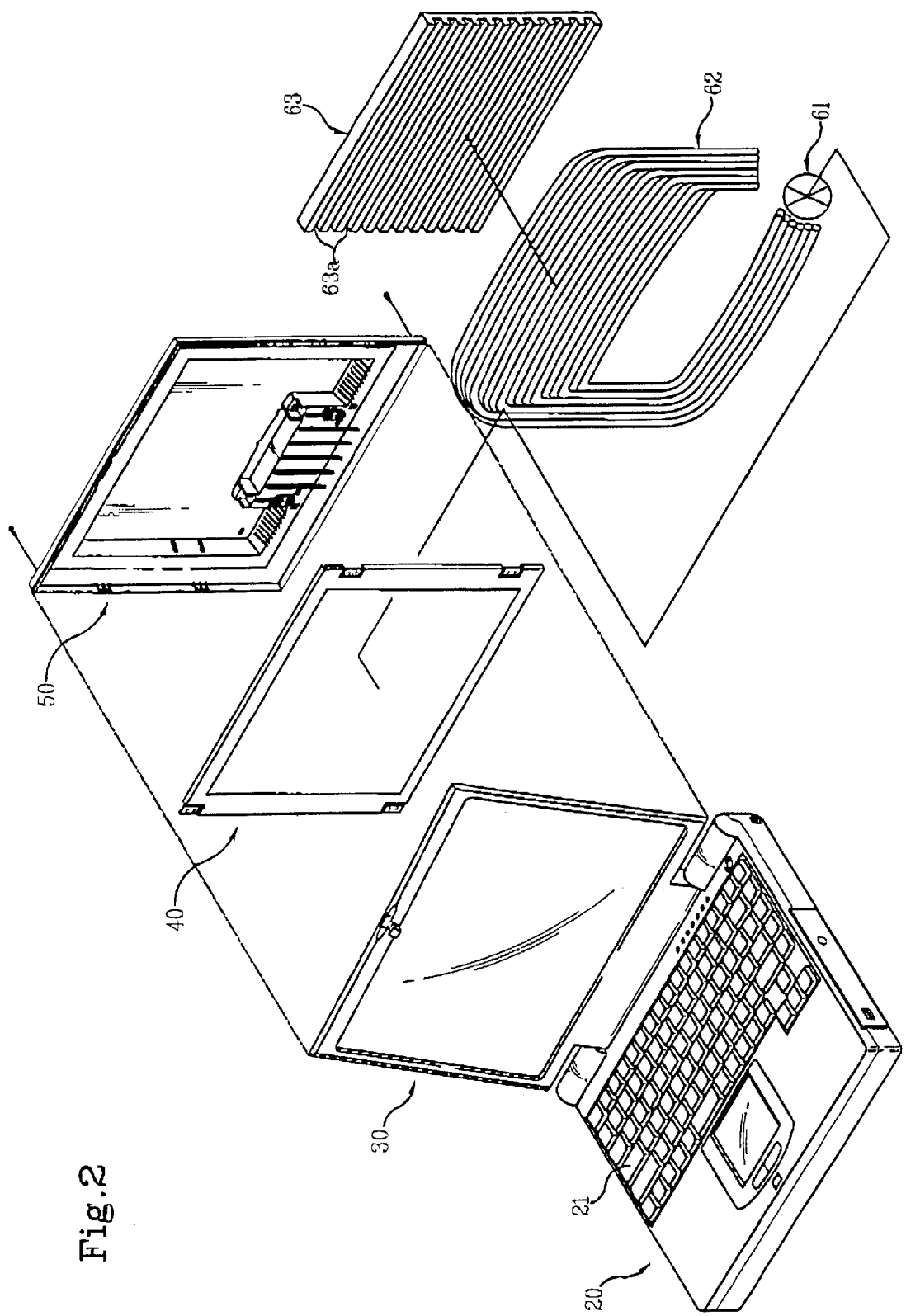
FIG. 2 is a disassembled perspective view illustrating a liquid crystal display apparatus having a back lighting apparatus of a liquid crystal display apparatus using optical fibers, according to the present invention.

FIG. 2 is a disassembled perspective view illustrating a liquid crystal display monitor mounted in a laptop computer as a liquid crystal display apparatus including a back lighting apparatus using an optical fiber according to one embodiment of the present invention.

As shown in FIG. 2, the liquid crystal display monitor includes a main body 20 having an integrated keyboard 21, a front casing 30 hinged at a rear portion of the upper surface of the main body 20 and being rotatably engaged to the main body 20, a liquid crystal display panel 40 attached on the back surface of the front casing 30 and displaying a video signal, and a rear casing 50 for fixing the liquid crystal display panel 40 to the front casing 30 for thereby enclosing a back lighting apparatus 60, which includes an optical fiber, in the liquid crystal display apparatus in the rear casing 50.

Figure 3:
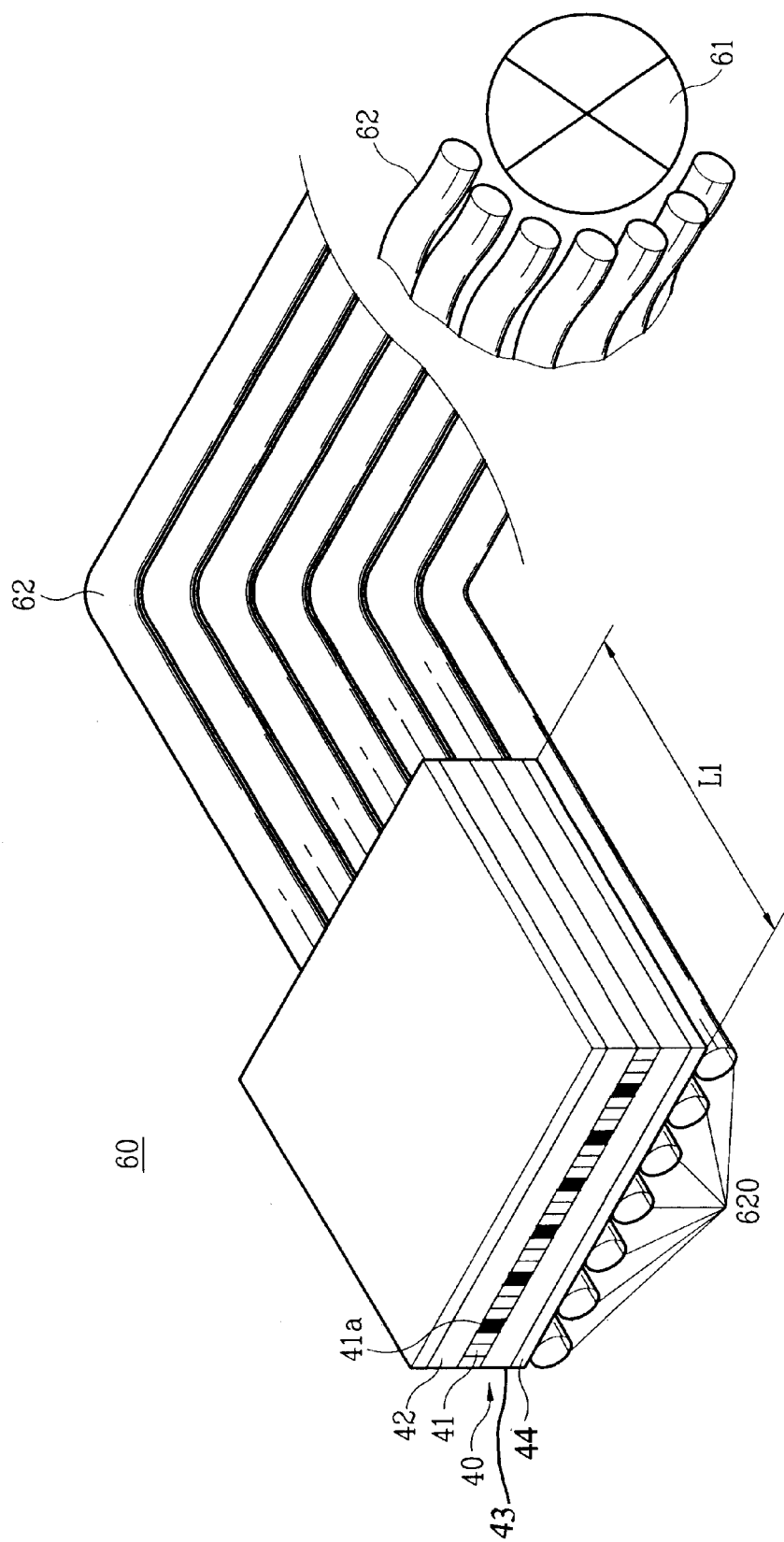
FIG. 3 is a schematic view illustrating the construction of a back lighting apparatus of a liquid crystal display apparatus according to the present invention.

In one embodiment, back lighting apparatus 60 of a liquid crystal display apparatus according to the present invention, has an optical fiber bundle having the same number of optical fibers 62 as the number of lines of pixels, that is, rows or columns of pixels, of the liquid crystal display panel 40, so that light is outputted based on the pixel line (reference numeral 41 of FIG. 3). The optical fibers 62 are fixed into grooves 63a of the support plate 63. In FIG. 2, a magnified portion of support plate 63, showing fewer grooves than would typically be present, is illustrated.

FIG. 3 is a schematic view illustrating the structure of a back lighting apparatus of a liquid crystal display apparatus using an optical fiber according to the present invention. As shown, the back lighting apparatus of a liquid crystal display apparatus using an optical fiber according to the present invention includes a light source 61 for outputting light, an optical fiber 62 having one end optically connected with the light source 61 and having a part attached to the back surface of the liquid crystal display panel 40 by a support plate 63 (shown in FIG. 2), for providing light to a liquid crystal disposed between the front and back glass plates 42 and 43 of the liquid crystal display panel 40 so as to form the pixel line 41. Typically, polarization plate 44 is located on the back surface of back plate 43.

In the liquid crystal display panel 40, each pixel line 41 is formed of R, G, B elements for the three primary colors, and is separated from the next pixel line by a gap of a certain distance. A signal and voltage supply cable is installed in each gap 41a for driving each pixel line 41.

The optical fibers 62 which output light with respect to the liquid crystal display panel 40 may be provided in the same number as the number of pixel lines 41 of the liquid crystal display panel 40, and are bundled. Both ends of each optical fiber may be optically connected with the light source 61 (to be described later in FIG. 10), and a part of each optical fiber 62 is mounted aligned with a corresponding pixel line 41 of the back surface of the liquid crystal display panel 40 for thereby transmitting light of the light source 61 and illuminating each pixel line 41 of the liquid crystal display panel 40.

To illuminate the pixel line, each optical fiber 62 includes a diffusion line 620 of the same length as the pixel line 41, the diffusion line being oriented lengthwise on an outer surface of the optical fiber, and the optical fiber 62 is mounted on the back surface of the liquid crystal display panel 40 in the orientation such that the diffusion line 620 is opposite to, that is, facing away from, the liquid crystal display panel 40. Here, the term "diffusion line" refers to region of the outer surface of the optical fiber which has been modified to diffuse light. This will generally be a roughened region, and may be achieved by etching or polishing the optical fiber. Therefore, the diffusion line 620 scatters the light transmitted from the light source and illuminates corresponding pixel line 41 to thereby light the back surface of the liquid crystal display panel by pixel lines 41.

FIGS. 4A through 4E are views illustrating various shape diffusion lines for scattering light in the optical fiber. As shown, in optical fibers used in the back lighting apparatus of the liquid crystal display apparatus according to the present invention, the diffusion line 620 may be formed in various forms for scattering light transmitted through the optical fiber and outputting to the liquid crystal display panel 40.

Figure 4A:
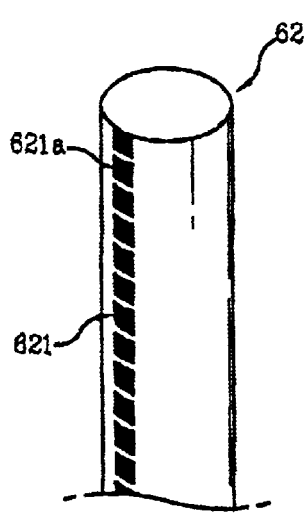
FIGS. 4A through 4F are perspective views illustrating various types of optical fibers used in a back lighting apparatus of a LCD apparatus according to the present invention.
Figure 4B:
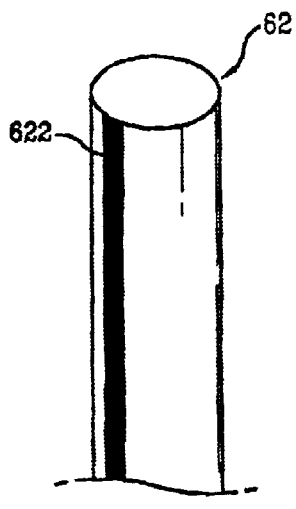
Figure 4C:
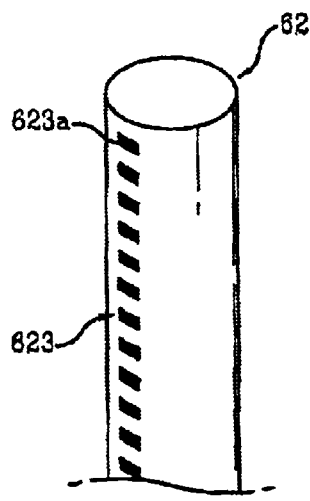
Figure 4D:
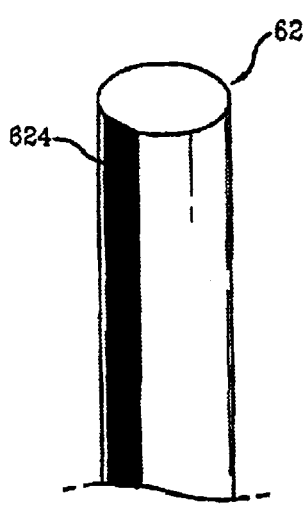
Figure 4E:
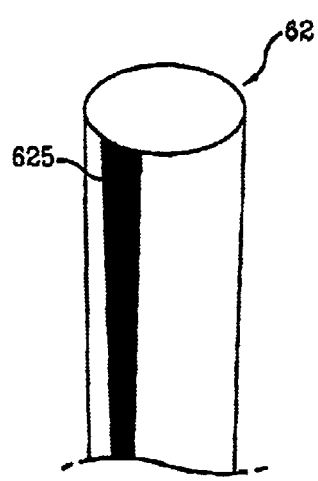
Figure 4F:
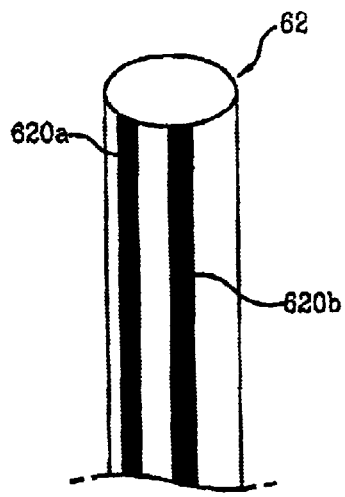

In FIG. 4A, a diffusion line 621 is formed in the optical fiber as a plurality of diffusion plates 621a arranged lengthwise, spaced at a certain distance, along the optical fiber. In FIG. 4B, a diffusion line 622 which is continuous in the lengthwise direction of optical fiber 62 is formed in optical fiber 62. In FIG. 4C, a plurality of horizontal, or crosswise, diffusion stripes 623a of a certain length and width are formed in the optical fiber 62 yielding a diffusion line 623. The optical fiber 62 of FIG. 4D has a planar, or flat, diffusion line 624 formed by polishing the outer surface of the fiber, as opposed to the curved surfaces of the other described diffusion lines. The optical fiber 62 of FIG. 4E includes a diffusion line 625 capable of varying the optical scattering along the length of the optical fiber. Specifically, the optical scattering ratio may be increased by increasing the width of the diffusion line further from the light source (as illustrated in FIG. 4E toward the top of the fiber), to compensate for loss of light in the optical fiber. FIG. 4F illustrates an optical fiber 62 having two longitudinal diffusion lines 620a and 620b. It will be apparent that the two diffusion lines may further be formed of plates 621a, stripes 623a, or of planar diffusion lines 624, or of varying width as in diffusion line 625, these permutations not being shown.

In the back lighting apparatus of a liquid crystal display apparatus, the optical fiber 62 operates as a rod lens and is capable of lighting a corresponding pixel line 41 when the pixel line 41 of the liquid crystal display panel 40 is correctly aligned with the fiber. In addition, a reflective material 62a is coated on the outer surface of the optical fiber 62 except for the portion through which the light is transmitted to the pixel line 41, so that the light transmitted in the horizontal direction in the optical fiber 62 is reflected to the diffusion line 620, thereby enhancing the scattering efficiency. The reflective material may be formed of an alkyd resin.

In addition, when the center of the optical fiber is aligned with the center of the corresponding pixel line 41, the scattering angle of the light is increased based on the diffusion line 620 for thereby increasing a field of view of the liquid crystal display panel 40.

The optical fiber 62 is directly attached to a polarization plate 44 attached to a back surface glass plate 43 of the liquid crystal display panel 40, and the optical concentrating ratio with respect to each pixel line of the liquid crystal display panel is different based on the distance from the polarization plate 44. In addition, the optical concentrating ratio is different based on the width of the diffusion line 620 formed in the optical fiber 62 and the optical refractive index of the optical fiber 62.

Figure 5A:
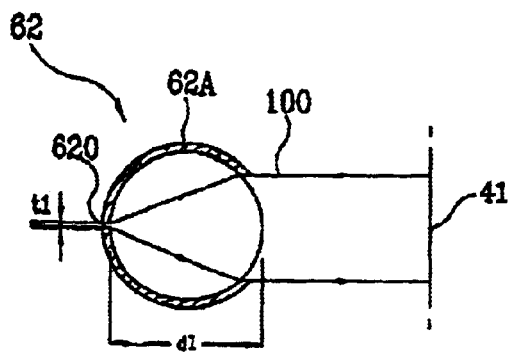
FIGS. 5A through 5C are cross-sectional views of optical fibers having different diffusion lines and refractive indexes used in a back lighting apparatus of a liquid crystal display apparatus according to the present invention, illustrating the light transmission through the fibers.
Figure 5B:
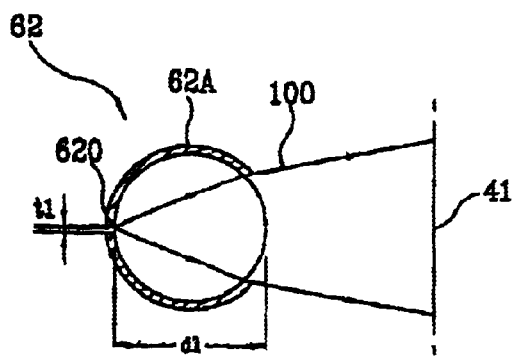
Figure 5C:
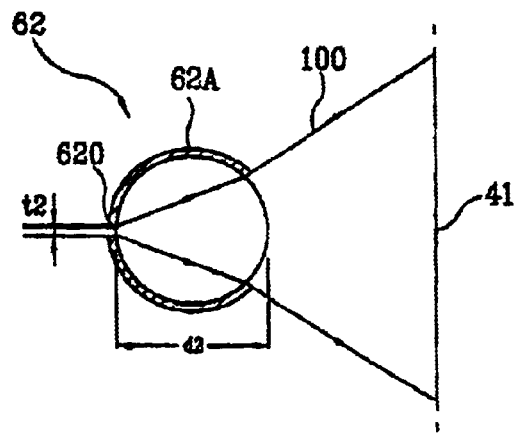

FIGS. 5A through 5C are cross-sectional views illustrating the concentration degrees of light by three optical fibers, each having a different refractive index and width of the diffusion line, in an optical fiber distanced from a pixel line by 1 mm and having a diameter of 300 μm. The optical fibers 62 are illustrated showing the position of reflective material 62a. The thickness of reflective material 62a is exaggerated in FIGS. 5A–C for clarity; the actual reflective material will generally be a very thin coating.

The optical fiber of FIG. 5A is an optical fiber having a diffusion line 620 having a width t1 of $\frac{1}{15}$ of the diameter d1 of the optical fiber and having a refractive index of 1.73, the optical fiber of FIG. 5B is an optical fiber having a diffusion line having a width t1 of $\frac{1}{15}$ of the diameter d1 and having a refractive index of 1.19, and the optical fiber of FIG. 5C is a diffusion line 620 having a width t2 of $\frac{2}{15}$ of the diameter d2 of the optical fiber and having a refractive index of 1.49. The optical fibers illustrated in the embodiments shown in FIGS. 5A to 5C have a uniform refractive index in cross-section, that is, they do not have a core and cladding structure.

As shown therein, in the optical fiber of FIG. 5a, the light 100 scattered in the diffusion line 620 is inputted in parallel with respect to the pixel line 41. Since the outer surface of optical fiber 62 is coated, the light is scattered by the optical fiber 62, and it is possible to decrease the width of the light emitted to the outside of the optical fiber 62. In the optical fiber of FIG. 5B, the light 100 scattered by the diffusion line 620 is emitted at a wider angle compared to the optical fiber of FIG. 5A. In the optical fiber of FIG. 5C, the light 100 scattered by the diffusion line 620 is emitted at a much wider angle compared to the optical fiber of FIG. 5B.

Therefore, as the width of the diffusion line 620 is increased and the refractive index is made smaller, the diffusion angle is increased.

When designing the optical fiber, the width of the diffusion line and refractive index of the optical fiber, and the distance with respect to the polarization plate are set based on the width of the pixel line of the liquid crystal display panel.

Figure 6:
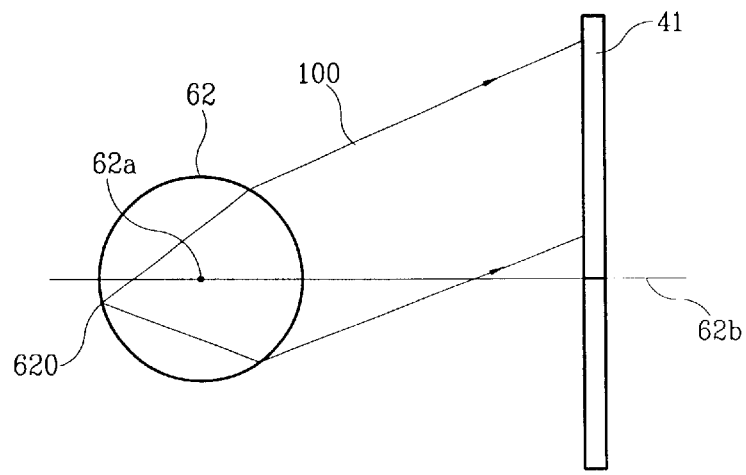
FIG. 6 is a cross-sectional view illustrating the effect of diffusion line position on light transmission through an optical fiber of a back lighting apparatus of a liquid crystal display apparatus according to the present invention.

FIG. 6 is a view illustrating the directional variation of the scattering light of the optical fiber based on the relative position of the diffusion line. As shown in FIG. 6, in the case that the diffusion line 620 deviates from the center line 62b (which passes through the center line 62a of the optical fiber 62 and is perpendicular to the plane defined by the pixel lines), the light 100 emitted from the optical fiber 62 is deflected with respect to the pixel line 41, in the direction opposite to the direction in which the diffusion line 620 is deviated, and in proportion to the deviated distance of the diffusion line 620. Therefore, a desired emitting angle of the optical fiber 62 is obtained by controlling the relative position of the diffusion line 620 with respect to the center of the optical fiber.

Since the light is emitted through a portion of the outer surface of the optical fiber in which no reflective material is coated, the emitting angle of the optical fiber may be controlled by adjusting the range of the reflective coating.

Figure 7:
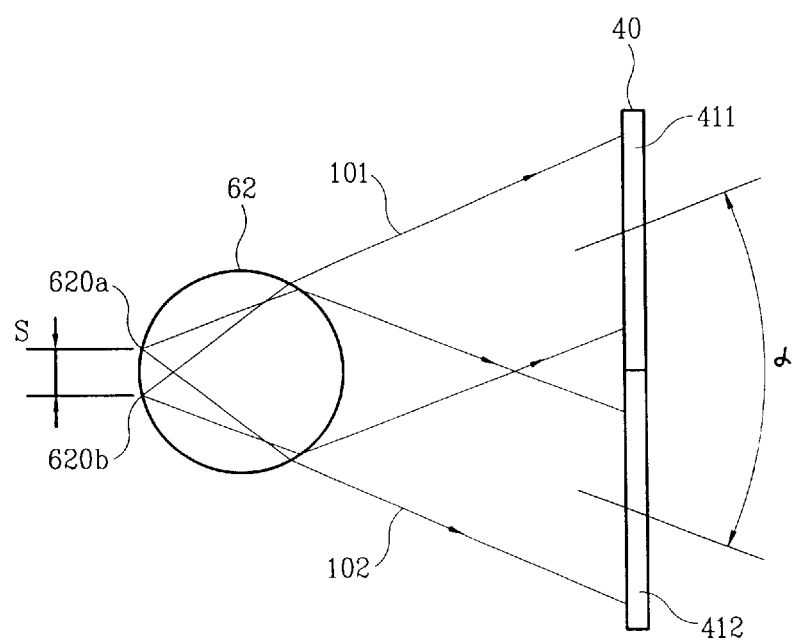
FIG. 7 is a cross-sectional view illustrating the concurrent illumination of two pixel lines by an optical fiber having two diffusion lines in a back lighting apparatus of the liquid crystal display apparatus according to the present invention.

As shown in FIG. 7, the back lighting apparatus of a liquid crystal display apparatus using an optical fiber according to the present invention is implemented in such a manner that one optical fiber concurrently illuminates two neighboring pixel lines.

In FIG. 7, two diffusion lines 620a and 620b spaced apart by the distance "s" with respect to the center of the optical fiber do not interfere with each other and emit light in two directions. The optical fiber 62 having two diffusion lines 620a and 620b is aligned with the center line between two pixel lines 411 and 412 of the liquid crystal display panel 40, and it is possible to concurrently illuminate two pixel lines 41 using one optical fiber 62. Therefore, in this case, it is possible to illuminate the liquid crystal display panel using a number of the optical fibers which corresponds to half of the number of the pixels lines.

Figure 8:
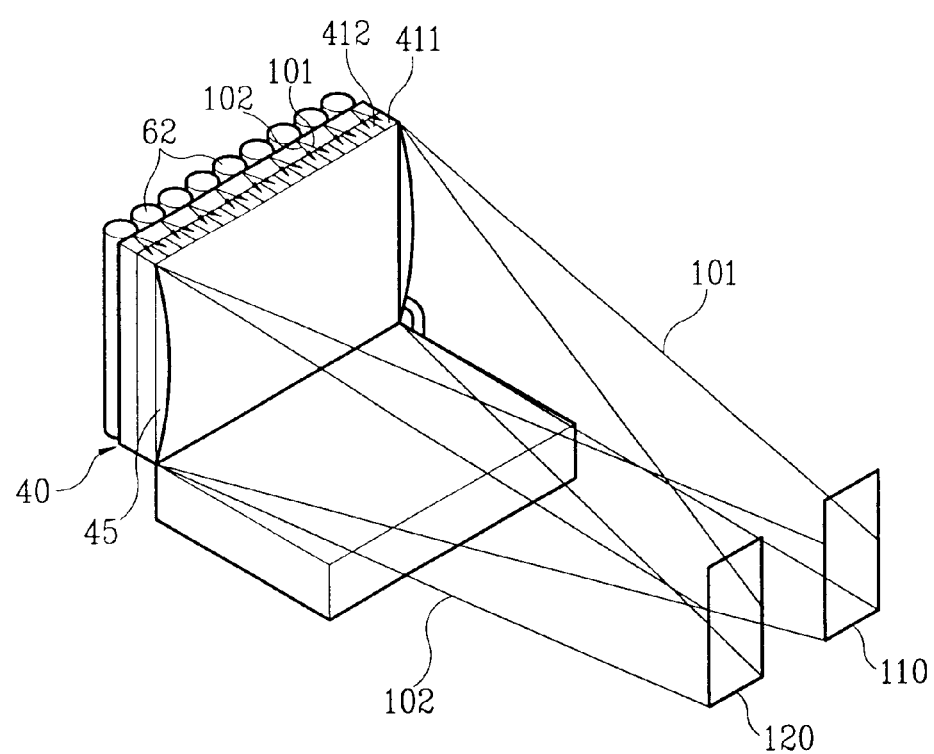
FIG. 8 is a schematic view illustrating a 3D image implemented by a back lighting apparatus of a liquid crystal display apparatus using an optical fiber according to the present invention.

In addition, the back lighting apparatus of a liquid crystal display apparatus using an optical fiber according to the present invention is capable of implementing a three-dimensional (3D) image as shown in FIG. 8 by concurrently illuminating two pixel lines using one optical fiber having two diffusion lines.

Namely, as shown in FIG. 7, the optical fiber 62 formed with two diffusion lines 620a and 620b at a certain distance "s" is arranged in parallel with the pixel lines 411 and 412 at the center between the neighboring pixel lines 411 and 412. Thereafter, when the neighboring two pixel lines 411 and 412 are concurrently illuminated by one optical fiber, as shown in FIG. 8, the optical fiber 62 generates a left direction parallel scattering light 101 and a right direction parallel scattering light 102 which pass through two pixel lines 411 and 412. The scattering lights 101 and 102 pass through the left direction pixel line 411 and the right direction pixel line 412 and are outputted in a direction parallel with the scattering light from other optical fibers 62. A fresnel lens 45 is attached at a front portion of the liquid crystal display panel 40 for diffracting light. In this case, the left and right direction scattering light 101 and 102 scattered by two diffusion lines 620a and 620b of FIG. 7 of each optical fiber 62 form a right view region 110 and a left view region 120 for thereby implementing a 3D image using the thusly formed left and right view regions 120 and 110.

The back lighting apparatus of this embodiment of a liquid crystal display apparatus using an optical fiber according to the present invention includes two diffusion lines 620a and 620b in one optical fiber 62. In addition, the neighboring optical fibers 62 provided by the same number as the number of the pixel lines 41 of the liquid crystal display panel have different diffusion lines and emitting angles for thereby emitting a corresponding pixel line 41, whereby it is possible to implement a 3D image.

Figure 9A:
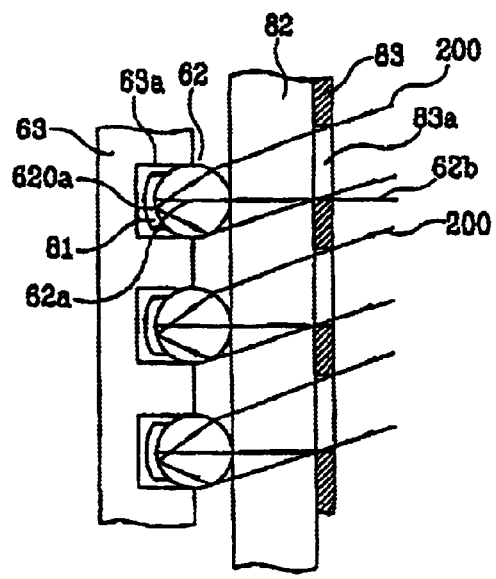
FIGS. 9A and 9B are schematic views illustrating a process in which two diffusion lines are formed in an optical fiber used in a back lighting apparatus of a liquid crystal display apparatus using an optical fiber according to the present invention.
Figure 9B:
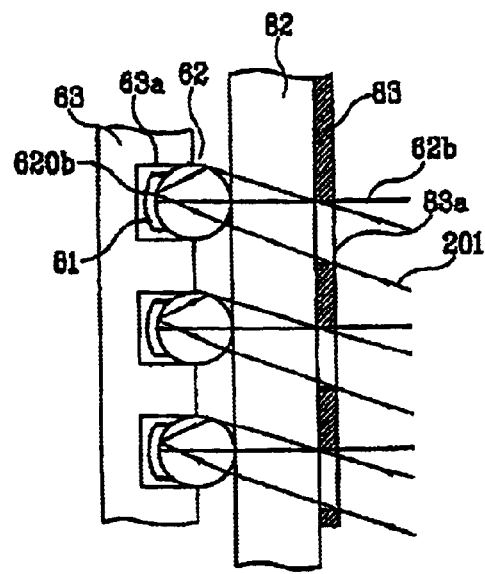

FIGS. 9A and 9B are schematic views illustrating a process for forming two diffusion lines in an optical fiber capable of concurrently illuminating two pixel lines using one optical fiber and implementing a 3D image.

The diffusion lines of the optical fiber are formed by an etching method or a lithography method. The process will be explained with reference to FIG. 9.

Grooves 63a are formed on one surface of a support plate 63 having the same size as the liquid crystal display panel (40 of FIG. 3) and are formed in the number which is half of the number of the pixel lines (41 of FIG. 3). An optical fiber 62 is coated in a predetermined region with a reflective material. A photoresist material 81 is coated on an outer surface of the optical fiber 62, and the fiber 62 is placed in groove 63a with photoresist material 81 oriented in the direction of the lower surfaces of groove 63a. In addition, glass substrate 82 having the same thickness as the liquid crystal display panel covers the fibers. A mask 83 having slit-shaped openings 83a having the same width and distance as the pixel lines(41 of FIG. 3) of the liquid crystal display panel passes through the center 62a of the optical fiber covers the glass substrate in such a manner that one end of the opening 83a is placed on the center line 62b vertical to the glass substrate 82.

In this state, when a parallel light 200 having a certain wavelength capable of photo-reacting the photosensitive material is scanned at a certain angle with respect to the center line 62b of the optical fiber 62, the parallel light 200 is converged by the optical fiber 62, and a portion of the photoresist material 81 of each optical fiber forms one diffusion line 620a.

The mask 83 is moved by the width of the opening 83a, so that the other end of the opening 83a is matched with the center line 62b of the optical fiber 62, and a parallel light 201 is outputted at a certain angle with respect to the center line 62b of the optical fiber 62. The parallel light 201 photoresists another side of the photoresist material 81 based on a convergence of each optical fiber 62 for thereby forming another diffusion line 620b.

It will be appreciated that the above process may be readily modified to produce an apparatus having a support plate with one groove for each pixel line, and for optical fibers each having a single diffusion line.

Figure 10:
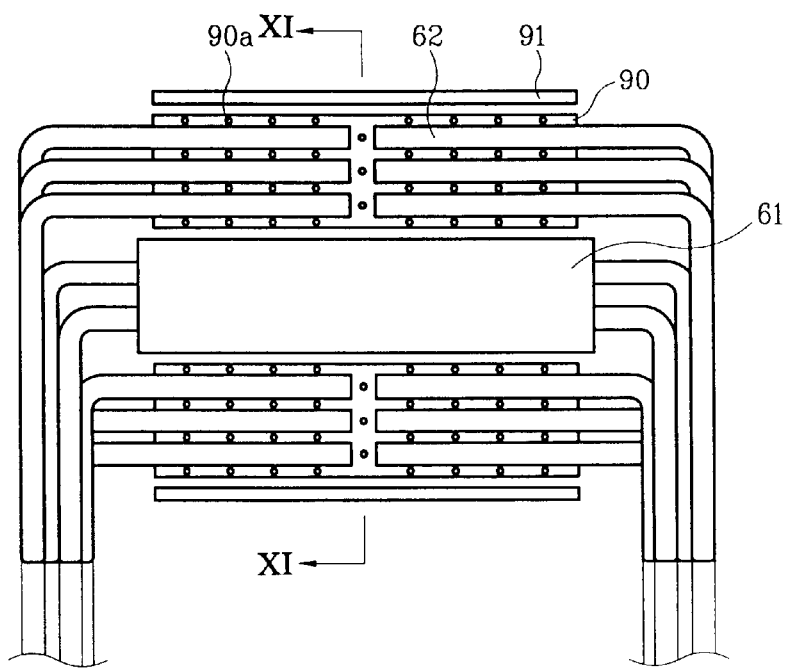
FIG. 10 is a lateral cross-sectional view illustrating an optical scattering unit capable of connecting an optical fiber and a light source in a back lighting apparatus of a liquid crystal display apparatus according to the present invention.
Figure 11:
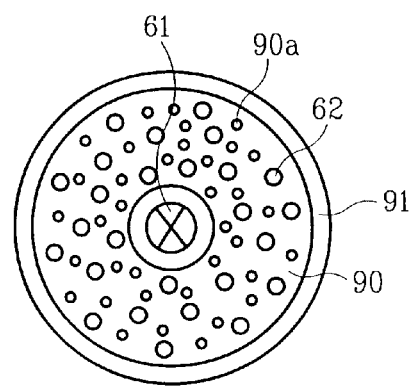
FIG. 11 is a cross-sectional view taken along line XI—XI of FIG. 10.

FIG. 10 is a schematic view illustrating a connection portion between the optical fiber and the light source in a back lighting apparatus of a liquid crystal display apparatus using an optical fiber according to the present invention. FIG. 11 is a cross-sectional view taken along line XI—XI of FIG. 10.

As shown therein, the optical fibers 62 of the back lighting apparatus of a liquid crystal display apparatus using an optical fiber according to the present invention is optically connected with the light source 61 by a light scattering unit 90. The light scattering unit 90, having a cylindrical shape, surrounds the light source 61 with the ends of the optical fibers being included and is surrounded by reflector 91, and the light generated by the light source 61 is scattered into multiple air bubbles 90a and is inputted into each optical fiber 62. The light scattering unit 90 may be made of an optical cement. The light from the light source 61 is transferred through the optical fiber 62 and is scattered by the diffusion line 620 of the optical fiber 62 and is inputted into each pixel line 41 of the liquid crystal display panel 40.

Figure 12:
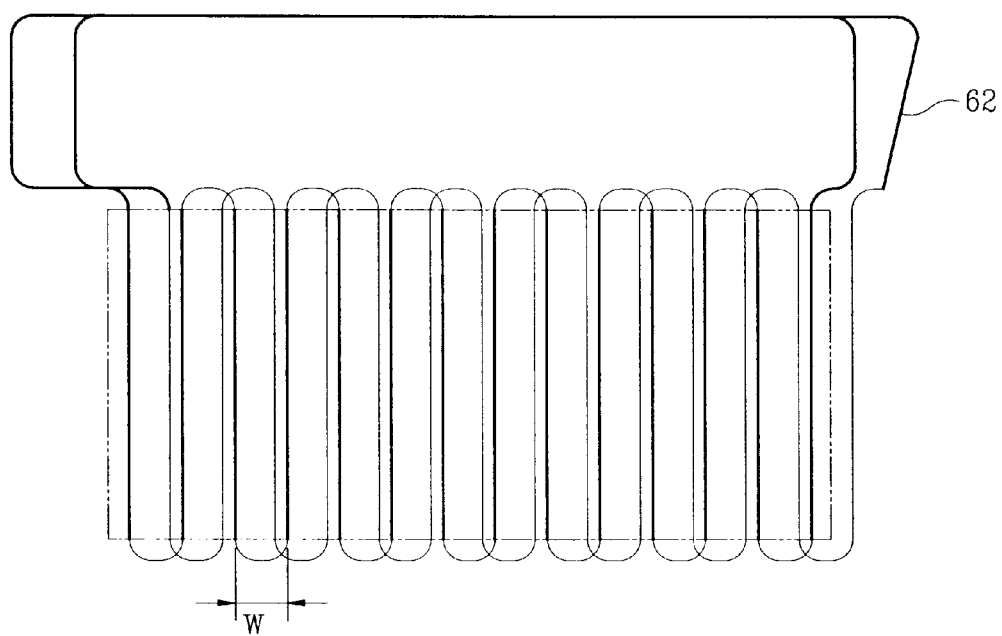
FIG. 12 is a plan view of an optical fiber bent in a zig-zag shape for lighting a liquid crystal display panel in a back lighting apparatus of a liquid crystal display apparatus using an optical fiber according to the present invention.

FIG. 12 is a plan view illustrating an alternative embodiment of the arrangement of the optical fibers in the present invention. Here, one optical fiber is capable of effectively lighting more than one pixel line of the liquid crystal display panel by using a bent zig-zag shape.

As shown in FIG. 12, in this embodiment of a back lighting apparatus of a liquid crystal display apparatus using an optical fiber according to the present invention, it is possible to increase optical efficiency by using one optical fiber 62 to light more than one pixel line 41 by bending the optical fiber 62 in a zig-zag shape to correspond with the pixel line (41 of FIG. 3). The number of optical fibers is significantly decreased, and the overall volume of the fibers is also decreased. In this case, the distance w between the pixel lines illuminated by the optical fiber 62 is determined based on the minimum curvature achievable in bending the optical fiber 62. The value obtained by dividing distance w (determined by the diameter of minimum curvature of the optical fiber) by the distance between the pixel lines 41 gives the number of pixel lines between one pixel line and the next pixel line served by the one fiber. Thus, the total number of pixel lines divided by this result indicates the number of optical fibers necessary to provide one optical fiber for each pixel line.

As described above, the back lighting apparatus of a liquid crystal display apparatus according to the present invention is capable of individually lighting each pixel using an optical fiber. Therefore, it is possible to uniformly light the entire liquid crystal display panel, and the optical efficiency is high so that the resolution of the monitor is enhanced. Since the light efficiency is high, the power consumption is decreased.

In addition, in the back lighting apparatus of a liquid crystal display apparatus according to the present invention, an optical fiber having two diffusion lines or optical fibers having different diffusion line positions are mounted in neighboring portions. Since light having different output angles may light the diffusion line positions, it is possible to light the neighboring pixel lines of the liquid crystal display panel based on light having different advancing angles. In addition, a 3D image is implemented without using an additional apparatus in the back lighting apparatus of a liquid crystal display apparatus according to the present invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such metes and bounds are therefore intended to be embraced by the appended claims.

What is claimed is:

1. A display apparatus, comprising:
a liquid crystal display panel comprising aback plate, said liquid crystal display panel having pixels arranged in pixel lines;
an optical fiber mounted behind said back plate and parallel to a first pixel line of the liquid crystal display, said optical fiber having a reflective coating over a portion of an outer surface of the optical fiber for retaining light in the optical fiber, and a first diffusion line formed lengthwise on the outer surface of the optical fiber, said first diffusion line being of a same length as, and in lengthwise position corresponding to, the first pixel line, and said first diffusion line facing away from the liquid crystal display panel;
a support plate having a first groove, said support plate being located behind the optical fiber, said optical fiber being mounted in said first groove of the support plate; and
a light source for illuminating ends of said optical fiber;
said first diffusion line being continuous in a lengthwise direction on the optical fiber.

2. The display apparatus of claim 1, said first diffusion line varying continuously in width along a length of the optical fiber.

3. The display apparatus of claim 1, said first diffusion line being formed by one of etching and lithography.

4. The display apparatus of claim 1, said reflective coating being formed of an alkyd resin.

5. The display apparatus of claim 1, said reflective coating not covering a portion of the optical fiber adjacent to the liquid crystal display panel.

6. The display apparatus of claim 1, further comprising:
a polarization plate disposed behind the back plate of the liquid crystal display panel, the optical fiber being mounted against said polarization plate.

7. The display apparatus of claim 1, each pixel of the liquid crystal display panel being divided into red, green and blue regions.

8. A display apparatus, comprising:
a liquid crystal display panel comprising a back plate, said liquid crystal display panel having pixels arranged in pixel lines;
an optical fiber mounted behind said back plate and parallel to a first pixel line of the liquid crystal display, said optical fiber having a reflective coating over a portion of an outer surface of the optical fiber for retaining light in the optical fiber, and a first diffusion line formed lengthwise on the outer surface of the optical fiber, said first diffusion line being of a same length as, and in lengthwise position corresponding to, the first pixel line, and said first diffusion line facing away from the liquid crystal display panel;
a support plate having a first groove, said support plate being located behind the optical fiber, said optical fiber being mounted in said first groove of the support plate; and
a light source for illuminating ends of said optical fiber;
said first diffusion line comprising one of a series of plates with each plate aligned with a corresponding pixel of said first pixel line, a series of crosswise stripes with each stripe aligned with a corresponding pixel of said first pixel line, and a flat region polished onto a surface of the optical fiber.

9. A display apparatus, comprising:
a liquid crystal display panel comprising a back plate, said liquid crystal display panel having pixels arranged in pixel lines;
an optical fiber mounted behind said back plate and parallel to a first pixel line of the liquid crystal display, said optical fiber having a reflective coating over a portion of an outer surface of the optical fiber for retaining light in the optical fiber, and a first diffusion line formed lengthwise on the outer surface of the optical fiber, said first diffusion line being of a same length as, and in lengthwise position corresponding to, the first pixel line, and said first diffusion line facing away from the liquid crystal display panel;
a support plate having a first groove, said support plate being located behind the optical fiber, said optical fiber being mounted in said first groove of the support plate; and
a light source for illuminating ends of said optical fiber;
said optical fiber having a second diffusion line parallel to the first diffusion line.

10. A display apparatus, comprising: a liquid crystal display panel comprising a back plate, said liquid crystal display panel having pixels arranged in pixel lines;
an optical fiber mounted behind said back plate and parallel to a first pixel line of the liquid crystal display, said optical fiber having a reflective coating over a portion of an outer surface of the optical fiber for retaining light in the optical fiber, and a first diffusion line formed lengthwise on the outer surface of the optical fiber, said first diffusion line being of a same length as, and in lengthwise position corresponding to, the first pixel line, and said first diffusion line facing away from the liquid crystal display panel;
a support plate having a first groove, said support plate being located behind the optical fiber, said optical fiber being mounted in said first groove of the support plate; and
a light source for illuminating ends of said optical fiber;
said support plate having a plurality of additional grooves parallel to said first groove and aligned with pixel lines of the liquid crystal display panel, a total number of the grooves being no greater than a number of the pixel lines of the liquid crystal display panel; and
said display apparatus further comprising a plurality of additional optical fibers, each having a diffusion line, said additional optical fibers being mounted in the additional grooves of the support plate.

11. The display apparatus of claim 10, a total number of the optical fibers being equal to the number of the pixel lines of the liquid crystal display panel.

12. The display apparatus of claim 10, the total number of the grooves of the support plate being equal to the number of the pixel lines of the liquid crystal display panel.

13. The display apparatus of claim 10, total number of the optical fibers being equal to one-half the number of the pixel lines of the liquid crystal display panel.

14. The display apparatus of claim 10, the total number of the grooves of the support plate being equal to one-half the number of the pixel lines of the liquid crystal display panel.

15. The display apparatus of claim 10, further comprising:
an optical diffusing unit surrounding said light source;
two ends of each optical fiber being mounted in said optical diffusing unit.

16. The display apparatus of claim 15, said optical diffusing unit being made of optical cement, and said optical diffusing unit having bubbles for scattering light into the ends of the optical fibers.

17. The display apparatus of claim 16, said optical diffusing unit being cylindrically shaped and further comprising a reflector disposed around the optical diffusing unit.

18. A display apparatus, comprising:
a liquid crystal display panel comprising aback plate, said liquid crystal display panel having pixels arranged in pixel lines;
an optical fiber mounted behind said back plate and parallel to a first pixel line of the liquid crystal display, said optical fiber having a reflective coating over a portion of an outer surface of the optical fiber for retaining light in the optical fiber, and a first diffusion line formed lengthwise on the outer surface of the optical fiber, said first diffusion line being of a same length as, and in lengthwise position corresponding to, the first pixel line, and said first diffusion line facing away from the liquid crystal display panel;
a support plate having a first groove, said support plate being located behind the optical fiber, said optical fiber being mounted in said first groove of the support plate; and
a light source for illuminating ends of said optical fiber;
said first diffusion line having a width approximately in a range of $1/15$ to $2/15$ of a diameter of the optical fiber, and a refractive index of the optical fiber being approximately in a range of 1.19 to 1.73.

19. A display apparatus, comprising:
a liquid crystal display panel comprising a back plate, said liquid crystal display panel having pixels arranged in pixel lines;
an optical fiber mounted behind said back plate and parallel to a first pixel line of the liquid crystal display, said optical fiber having a reflective coating over a portion of an outer surface of the optical fiber for retaining light in the optical fiber, and a first diffusion line formed lengthwise on the outer surface of the optical fiber, said first diffusion line being of a same length as, and in lengthwise position corresponding to, the first pixel line, and said first diffusion line facing away from the liquid crystal display panel;

a support plate having a first groove, said support plate being located behind the optical fiber, said optical fiber being mounted in said first groove of the support plate; and a light source for illuminating ends of said optical fiber; wherein:

said support plate has a second groove parallel to said first groove and aligned with a second pixel line of the liquid crystal display panel;

said optical fiber further comprises a bend in a region of the optical fiber where the optical fiber emerges from said first groove, a portion of said optical fiber past said bend being mounted into the second groove of the support plate; and said portion of the optical fiber in said second groove comprising an additional diffusion line formed lengthwise on the outer surface of the optical fiber.

20. A display apparatus, comprising:

a liquid crystal display panel comprising a back plate, said liquid crystal display panel having pixels arranged in pixel lines;

a Fresnel lens disposed on a front side of the liquid crystal display panel;

a plurality of optical fibers equal in number to one-half of a number of the pixel lines of the liquid crystal display panel, said optical fibers being mounted behind said back plate and parallel to the pixel lines of the liquid crystal display panel, each of said optical fibers being mounted in a position centered with respect to a pair of the pixel lines, and each optical fiber comprising a reflective coating disposed over a portion of an outer surface of said each optical fiber for retaining light in said each optical fiber, and two parallel diffusion lines formed lengthwise on the outer surface of said each optical fiber, said diffusion lines being of a same length as, and in lengthwise position corresponding to, the pixel lines, and said diffusion lines facing away from the liquid crystal display panel;

a support plate having a same number of parallel grooves as a number of the optical fibers, said support plate being located behind the optical fibers, said optical fibers being mounted in said grooves of the support plate; and a light source for illuminating both ends of said each optical fiber.

21. The display apparatus of claim 20, each of the two parallel diffusion lines of said each optical fiber comprising a series of plates with each plate aligned lengthwise along said each optical fiber with a corresponding pixel of a respective pair of pixel lines for said each optical fiber.

22. A method of manufacturing a display apparatus, comprising the steps of:

coating a predetermined portion of an optical fiber with a reflective coating;

coating a photoresist material on a longitudinal portion of the optical fiber;

mounting the optical fiber in a groove of a support plate with the longitudinal portion of the optical fiber and the photoresist material oriented into the groove;

positioning a substrate parallel to the support plate and over the portion of the optical fiber oriented into the groove, and positioning a mask over said substrate, said mask having slit-shaped openings corresponding to pixel positions of a liquid crystal display; and shining light through said mask onto said optical fiber to photoetch a diffusion line in the optical fiber.

23. The method of claim 22, said step of shining the light through said mask further comprising:

shining the light at a predetermined angle onto said optical fiber.

24. The method of claim 22, said step of shining the light through said mask further comprising:

shining the light at a first angle to photoetch a first diffusion line in the optical fiber; and moving said mask by a width of one of the slit-shaped openings, and then shining the light at a second angle to photoetch a second diffusion line parallel to said first diffusion line.

\* \* \* \* \*